(12) United States Patent
Parra

(10) Patent No.: US 11,279,221 B2
(45) Date of Patent: Mar. 22, 2022

(54) ACTIVE AERODYNAMIC SYSTEM WITH OFFSET ACTUATOR

(71) Applicant: Compagnie Plastic Omnium, Lyons (FR)

(72) Inventor: Stéphane Parra, Vaulx-en-Velin (FR)

(73) Assignee: COMPAGNIE PLASTIC OMNIUM, Lyons (FR)

(*) Notice: Subject to any disclaimer, the term of this patent is extended or adjusted under 35 U.S.C. 154(b) by 194 days.

(21) Appl. No.: 16/621,982

(22) PCT Filed: Jun. 8, 2018

(86) PCT No.: PCT/FR2018/051342
§ 371 (c)(1),
(2) Date: Jul. 22, 2020

(87) PCT Pub. No.: WO2018/229402
PCT Pub. Date: Dec. 20, 2018

(65) Prior Publication Data
US 2020/0406989 A1 Dec. 31, 2020

(30) Foreign Application Priority Data
Jun. 13, 2017 (FR) ...................................... 1755257

(51) Int. Cl.
*B60K 11/08* (2006.01)
*B62D 35/00* (2006.01)

(52) U.S. Cl.
CPC .......... *B60K 11/085* (2013.01); *B62D 35/005* (2013.01)

(58) Field of Classification Search
CPC ....... B60K 11/04; B60K 11/08; B60K 11/085; B62D 35/005

USPC ............................................. 296/180.1, 180.3
See application file for complete search history.

(56) References Cited

U.S. PATENT DOCUMENTS

| 9,233,605 | B2 | 1/2016 | Hijikata |
| 10,323,852 | B2 | 6/2019 | Takanaga et al. |
| 2011/0048691 | A1* | 3/2011 | Shin ..................... B60K 11/085 165/299 |
| 2012/0012410 | A1 | 1/2012 | Hori |
| 2014/0273806 | A1 | 9/2014 | Frayer |
| 2015/0090508 | A1 | 4/2015 | Chappex |

FOREIGN PATENT DOCUMENTS

| DE | 10306158 A1 | 8/2004 |
| FR | 2965857 A1 | 4/2012 |
| GB | 2483977 A | 3/2012 |
| KR | 20160057632 A | 5/2016 |

OTHER PUBLICATIONS

International Search Report and Written Opinion pertaining to PCT/FR2018/051345, dated Oct. 1, 2018.

* cited by examiner

*Primary Examiner* — Jason S Daniels
(74) *Attorney, Agent, or Firm* — Dinsmore & Shohl LLP

(57) ABSTRACT

The invention relates to an active aerodynamic system (1) for vehicles which comprises a moulded plastics structure (2) arranged to receive movable elements (3; 4) and an actuator (7) off-centre with respect to the structure (2). The system (1) of the invention comprises a force transmission member (5) which connects series of movable elements (3; 4) to each other. The force transmission member (5) also makes it possible to distribute the forces within the system (1).

9 Claims, 2 Drawing Sheets

ACTIVE AERODYNAMIC SYSTEM WITH OFFSET ACTUATOR

This invention relates to the field of motor vehicles, and in particular active aerodynamic systems of motor vehicles. The invention deals more specifically with the actuation of such active systems and the transmission of forces within these systems.

With the advent of information technology and automated systems, active systems for vehicles and more specifically active aerodynamic systems are now widespread and used in the automotive industry. An example of this is the flaps located at the air inlet grille at the front of the vehicle.

Active aerodynamic systems in which an actuator controls the setting in motion of movable components, such as the flaps, are known. The movable components are fastened to a structure, for example a frame in the case of the air inlet flaps. The actuator of these systems is connected to a single electronic control unit, present in the vehicle, which centralizes the data and manages the setting in motion of the movable components of the aforementioned systems.

For reasons of compactness of the system and optimization of the space available within the vehicle, the actuator can be offset on one side of the structure. This offset, for the case of the air inlet flaps, additionally allows a central position to be cleared, which position is required for the operation of the central radar. As a result, the actuator sets in motion a set of movable components that must ensure the transmission of forces to other sets of movable components, in order to set said other sets into motion. This transmission can be carried out directly between the driving set of movable components and the other sets, but is more generally carried out via an additional central part.

One of the drawbacks of such active aerodynamic systems is that a lot of play is likely to form along the chain of transmission of forces, particularly at the transmission points between the various members of this chain. Indeed, strong mechanical stress is applied at the transmission points because of the transmission of forces and can lead to the creation of unwanted play or to an increase thereof. As a result of the combination of this play and the high stress, the additional piece transmitting the forces between two sets of movable components is likely to twist or arch when the actuator controls the setting in motion of the driving set of movable components. As a result, the transmission of forces and, by extension, the setting in motion of the sets of movable components are disrupted, if not impossible.

The transmission of forces can also take place in the opposite direction, namely of a second set of components which can be moved towards the driving set, especially when the movable components of the second set are set in motion by external factors, such as aerodynamic pressure. In this case, the combination of this play and the high stress that is applied at the points of transmission between the second set of movable components and the additional part can result in the deformation of some movable components of the second set and/or of the additional part. Such a deformation of the movable components represents a disadvantage for the system which, therefore, no longer ensures the impermeability and aerodynamics required by the system, at the least at the location of the system comprising the deformed movable components.

In other words, it is very complicated for current active aerodynamic systems to allow for optimized integration into the vehicle environment, while ensuring the necessary mechanical properties for optimum operation.

In an attempt to overcome such drawbacks, it has been proposed to position an additional actuator on the other side of the structure so as to individually control the set or sets of movable components present in this part of the system.

However, such a solution is burdensome. Indeed, in addition to the additional cost and the extra weight that the use of a second actuator represents, the installation of the latter also involves the use of an additional line to connect to the electronic control unit. However, the connection lines to this unit are few and need to be economized as much as possible.

The invention aims to remedy these disadvantages by providing an active aerodynamic system for vehicles, characterized in that it comprises:

- a molded plastics structure comprising an upper part and a lower part, the structure being arranged to receive movable components,
- at least a first set of movable components and a second set of movable components each comprising at least one movable component,
- an actuator offset with respect to the structure and able to set into motion at least one of the movable components of the first set of movable components,
- a force transmission member connected to the first set of movable components and to the second set of movable components, said force transmission member being able to transmit forces from one set of movable components to the other, the force transmission member embodying a plane P, and in that the force transmission member is connected to the upper part and to the lower part of the structure by pivot connections allowing only translational displacements of the force transmission member in a plane parallel to the plane P and in that the force transmission member is able to distribute the forces within the system.

Thus, the system of the invention allows the formation of undesired play between the various component parts of the system to be avoided and allows a better distribution of forces, which protects these component parts against damage caused by mechanical stress. An "actuator offset with respect to the structure" is an actuator that does not occupy a position in the center of the structure, which makes it possible to free up space necessary for the use of a central radar. The actuator can therefore be offset on or towards the side of the structure, inside or outside of the latter. For example, the actuator may be fastened to an outer face of the structure. When necessary, the actuator is connected to at least one movable component by a mechanism for transmitting the force of the actuator in the axis of rotation of the movable component so that the movable component can be set in motion.

Advantageously, the actuator has an output axis and the movable component set in motion by the actuator has an axis of rotation, the output axis and the axis of rotation coinciding.

Thus, in this advantageous variant of the invention, no additional mechanism for setting the movable component in motion is necessary because, as the output axis of the actuator and the axis of rotation of the movable component coincide, the force of the actuator can be transmitted directly to the movable component.

Advantageously, the force transmission member is connected to the upper part and to the lower part of the structure by connecting rods forming pivot connections between the force transmission member and the structure.

Thus, it is easier to limit the displacement of the transmission member to a single displacement in a plane parallel to the plane P, especially when the movable components of the different sets are aligned with each other.

Advantageously, two connecting rods together form two collinear pivot connections between the force transmission member and the upper part of the structure, and two connecting rods together form two collinear pivot connections between the force transmission member and the lower part of the structure.

Thus, a better kinematic rigidity is obtained between the force transmission member and the structure, which makes it possible to ensure, with even greater certainty, the limitation of displacement of the force transmission member only in a plane parallel to the plane P that it embodies.

Advantageously, each of the sets of movable components is connected to the force transmission member at least by a pivot connection.

Thus, it is even easier to allow the displacement of the transmission member in a plane parallel to the plane P when the movable components of all sets are aligned. The risk of twisting of the force transmission member and the risk of deformation of the movable components are, therefore, further reduced.

Advantageously, each movable component is connected to the force transmission member at least by a pivot connection.

Thus, it is possible, on the one hand, to better transmit the forces of the movable components towards the transmission member and, on the other hand, to better distribute, among all the movable components, the centralized forces at the level of the force transmission member. Therefore, it is possible to reduce the stress that is applied to each of the movable components.

Advantageously, the first set of movable components has a first axis and the second set of movable components has a second axis, the first axis and the second axis intersecting one another (and therefore not coinciding).

Thus, the system according to this advantageous variant of the invention makes it possible to adapt to the architectural constraint of certain parts of the vehicles. It is in particular possible to integrate such a system in the bodywork parts forming the front faces of the vehicle, which tend today to have curved shapes. Therefore, it is sometimes necessary, in order to meet these new architectural constraints, to provide active aerodynamic systems in which the movable components of different sets are not aligned. This particular configuration is made possible by the arrangement and the connections of the force transmission member with the structure and the movable components. Indeed, it is possible to integrate a system according to the invention, with all its mentioned advantages, in environments where play and stress at the transmission points are very important, as is the case for aerodynamic systems where the movable components are not aligned.

Advantageously, each set of movable components is connected to the force transmission member by a ball joint having freedom along a translation axis.

Thus, it is possible to completely compensate for the lack of alignment between the movable components of different sets. Indeed, the ball joint having freedom along a translation axis, also called a "sliding ball joint", provides sufficient freedom of displacement to the force transmission member so that the latter can be displaced only in a plane parallel to the plane P, despite the lack of alignment of the movable components.

Advantageously, one of the movable components of at least one set of movable components is connected directly to another of the movable components of the same set of movable components by a connecting rod.

Thus, it is possible to ensure a better distribution of the forces between two movable components of the same set, connected by the connecting rod, whether these forces are due to a setting in motion by the actuator or to a redistribution of forces by the force transmission member. Consequently, the risks of deformation of these movable components are further reduced.

The invention also relates to an assembly of a motor vehicle part and a vehicle bodywork system and an active aerodynamic system for a vehicle, wherein the bodywork part is a front face of a vehicle.

The invention will be better understood upon reading the appended figures, which are provided by way of example and are by no means limiting, and in which.

Figure 1:
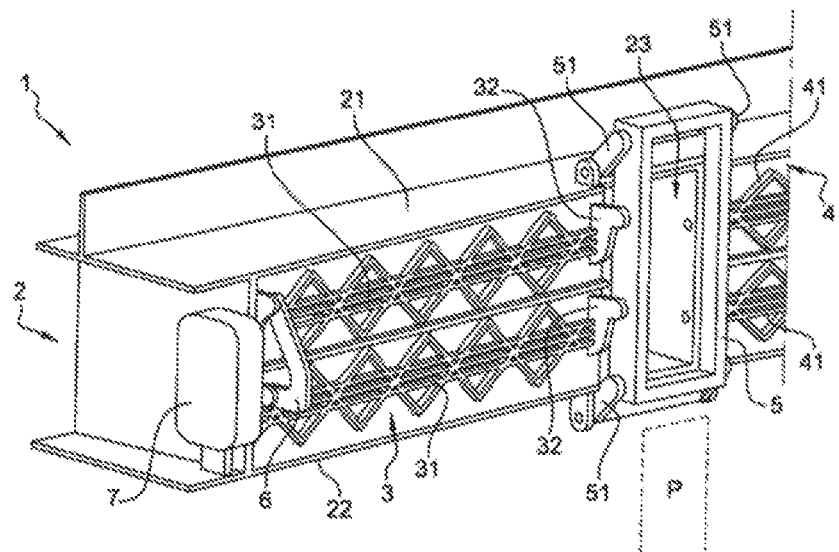
FIG. 1 is a perspective view illustrating part of an active aerodynamic system according to a first embodiment of the invention.

An active aerodynamic vehicle system 1, which comprises a structure 2, for example, made of molded plastics, will be described. This structure 2 comprises an upper part 21 and a lower part 22. It also has an opening 23 provided for the use of a radar (not shown). This structure 2 is arranged to receive, between its upper part and its lower part, a first set 3 of movable components and a second set 4 of movable components, separated from each other by a force transmission member 5 which embodies a plane P.

Figure 2:
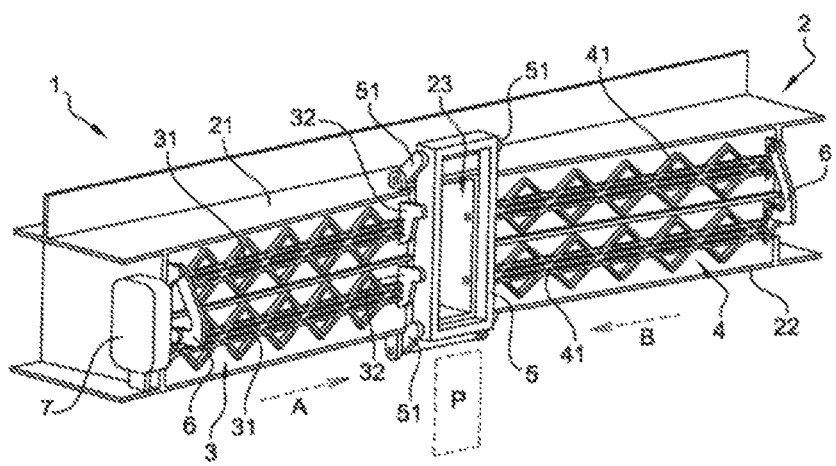
FIG. 2 is a perspective view illustrating part of an active aerodynamic system according to a second embodiment of the invention.

It can be seen in FIGS. 1 and 2 that the two sets (3, 4) of movable components each consist of two movable components (31, 41), in this case aerodynamic air inlet flaps. In an embodiment not shown, the sets of movable components may comprise more than two movable components each. The system can also comprise one or more additional force transmission members to manage the distribution of forces of the additional movable components.

Each movable component (31, 41) of a single set (3, 4) is connected to the other movable component of the same set, at the outer edge of the structure 2, by a connecting rod 6 which facilitates a synchronized setting in motion of the two movable components (31, 41). This setting in motion is ensured by an actuator 7, in an offset position. This actuator 7, fastened on the structure 2, has an output axis coinciding with the axis of rotation of at least one of the movable components 31 of the first set 3, which allows it to directly induce the motion of this movable component 31. This motion is then transmitted gradually by the movable components (31, 41) and by the force transmission member 5. The opposite phenomenon occurs when at least one of the movable components 41 of the second set 4 is set in motion. Such a setting in motion can be induced by external factors, for example aerodynamic pressure.

At the other end, namely the end of each movable component (31, 41) located closest to the force transmission member 5, each movable component (31, 41) is connected to the force transmission member 5 located in the center of the system. The movable components 31 of the first set 3 are connected to the force transmission member 5 by means of connecting means 32. The connecting means 32 which allow the connection of the movable components 41 of the second set 4 are not visible in the figures. In the embodiment of FIG. 1, the connection means 32 provide, at the least, a pivot connection between the transmission member 5 and the movable components 31 of the first set 3.

The force transmission member 5 is connected to the upper part 21 and to the lower part 22 of the structure 2 by two collinear pivot connections provided, in the examples of FIGS. 1 and 2, by connecting rods 51. Such an arrangement limits the displacement of the force transmission member 5 which can therefore only be displaced in a plane parallel to the plane P that it embodies, which protects the system against twisting of the transmission member 5 or against deformation of one of the movable components. The latter could cause leaks or poor aerodynamic performance of the system 1. By virtue of its central position within the system, the force transmission member 5 allows the forces transmitted to it by the sets (3, 4) of movable components to be distributed throughout the system 1, which forces may emanate from the actuator 7 or from the environment outside the system 1.

Figure 3:
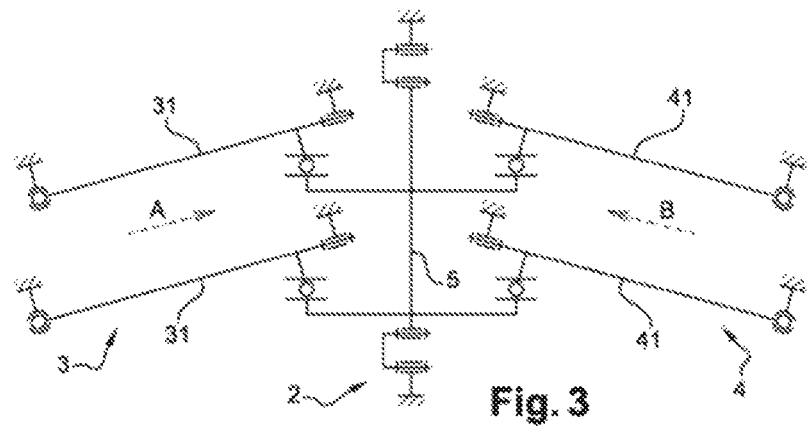
FIG. 3 is a diagram illustrating the operation and connections of the system of FIG. 2.
Figure 6:
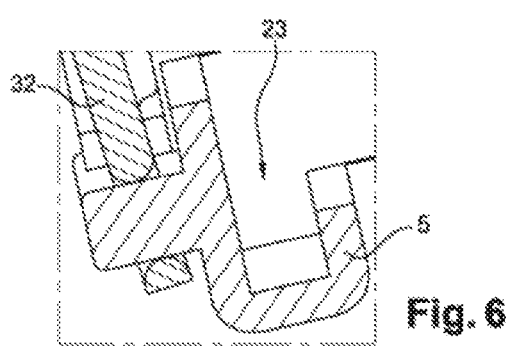
FIG. 6 is an enlarged view of a connection between a movable component and the force transmission member, shown in a sectional view along the plane P of FIG. 2.

In the second embodiment, shown in FIG. 2, the sets (3, 4) of movable components are not aligned. Indeed, the movable components 31 of the first set 3 have an axis A, whereas the movable components 41 of the second set 4 have an axis B, Axes A and B are intersecting axes. Therefore, the connecting components 32 which allow the connection of the sets (3, 4) of movable components and the transmission member 5 ensure a ball joint having freedom along a translation axis. This connection, seen in more detail in FIG. 6, also called a "sliding ball joint," enables compensation, in particular in terms of play, of the non-alignment of the movable components (31, 41) of the first set 3 and the second set 4 and thus ensure that the force transmission member 5 does not twist. To achieve this, the connecting means 32 each have an opening or a cavity cooperating with a pin of the force transmission member 5 in order to establish a ball joint connection having translational freedom. The different types of connection between component parts of the system 1 according to the second embodiment are visible in FIG. 3.

Figure 4:
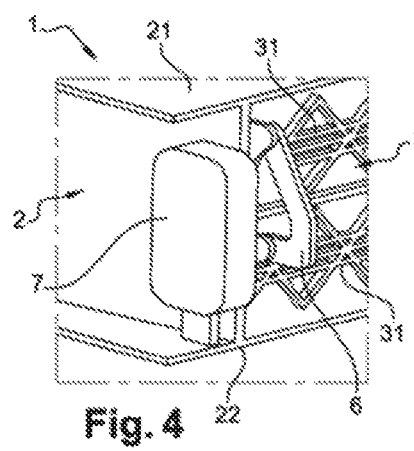
FIGS. 4 and 5 are two perspective views of the part of the system of FIGS. 2 and 3 which comprises the offset actuator.
Figure 5:
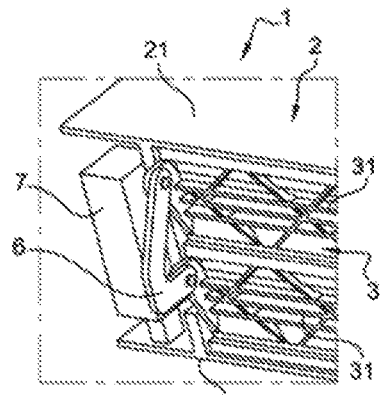

The enlarged views shown in FIGS. 4 and 5, from different perspectives, make it possible to visualize in more detail the arrangement of the various component parts within the structure 2 and the relationship between the actuator 7 and the movable components 31 of the first set 3, the latter being connected by a connecting rod 6.

The system operates as follows.

When the passage of air is required at the front of the vehicle (not shown), the actuator is powered by a control unit (not shown) and sets into motion at least one of the movable components 31 of the first set 3. By means of the connecting rod 6, the second movable component 31 of the same set 3 is also set in motion, which causes a change in its inclination and therefore a passage for the air that can enter the interior of the vehicle, for example to cool the radiator located just behind the front face of the vehicle. The forces, caused by the movable components 31 of the first set 3 being set in motion, are transmitted to the force transmission member 5 which will distribute them more equitably within the entire system. In parallel with this distribution, the force transmission member 5 will also transmit a portion of these forces to the movable components 41 of the second set 4 so as to cause a change in their inclination, this transmission being facilitated by the connecting rod 6 connecting the two movable components 41.

Conversely, when it is necessary for the passage to remain closed to any fluid, the aerodynamic and mechanical stresses that are applied to the movable components (31, 41) generate forces that propagate in the same manner as before to the force transmission member 5. In this case, the sole purpose of the force transmission member 5 is the distribution of forces within the entire system 1, without setting any movable components into motion, so that these forces do not generate the appearance of or increase the play between the different component parts of the system 1, thus making it possible to limit the leaks, or so that these forces do not damage the movable components (31, 41) or the force transmission member 5.

REFERENCE NUMERAL DESIGNATED OBJECT

1 . . . Active aerodynamic system
2 . . . . Structure
3 . . . . First set of movable components
4 . . . Second set of movable components
5 . . . Force transmission member
6 . . . Connecting rod connecting two movable components of a same set
7 . . . Actuator
21 . . . Upper part of the structure
22 . . . Lower part of the structure
23 . . . Opening intended for the use of a radar
31 . . . Movable component of the first set of movable components
32 . . . Connecting means
41 . . . Movable component of the second set of movable components
51 . . . Connecting rod for fastening the force transmission member to the structure

The invention claimed is:

1. An active aerodynamic system for vehicles, comprising:

a molded plastics structure comprising an upper part and a lower part, the structure being arranged to receive movable components, at least a first set of movable components and a second set of movable components each comprising at least one movable component, an actuator that is offset with respect to the structure and configured such that it can set into motion at least one of the movable components of the first set of movable components, a force transmission member connected to the first set of movable components and to the second set of movable components, said force transmission member configured to transmit forces of one set of movable components to the other, the force transmission member embodying a plane P, and wherein the force transmission member is connected to the upper part and to the lower part of the structure by pivot connections configured to permit only translational displacements of the force transmission member in a plane parallel to the plane P and such that the force transmission member distributes forces within the system, wherein the force transmission member is connected to the upper part and to the lower part of the structure by connecting rods forming pivot connections between the force transmission member and the structure.

2. An active aerodynamic system according to claim 1, wherein the actuator has an output axis and the movable component set in motion by the actuator has an axis of rotation, the output axis and the axis of rotation coinciding.

3. An active aerodynamic system according to claim 1, wherein two connecting rods together form two collinear pivot connections between the force transmission member and the upper part of the structure and wherein two connecting rods together form two collinear pivot connections between the force transmission member and the lower part of the structure.

4. An active aerodynamic system according to claim 3, wherein each of the sets of movable components is connected to the force transmission member at least by a pivot connection.

5. An active aerodynamic system according to claim 4, wherein each movable component is connected to the force transmission member at least by a pivot connection.

6. An active aerodynamic system according to claim 5, wherein the first set of movable components has a first axis and the second set of movable components has a second axis, the first axis and the second axis intersecting with each other.

7. An active aerodynamic system according to claim 6, wherein each of the sets of movable components is connected to the force transmission member by a ball joint having freedom along a translation axis.

8. An active aerodynamic system according to claim 7, wherein one of the movable components of at least one set of movable components is connected directly to another of the movable components of the same set of movable components by a connecting rod.

9. An assembly of a vehicle bodywork part and of an active aerodynamic system for a vehicle according claim 1, wherein the vehicle bodywork part is a front face of a vehicle.

* * * * *